United States Patent Office 3,026,251
Patented Mar. 20, 1962

3,026,251
METHOD OF ISOLATING GASTRIC SECRETION INHIBITORY SUBSTANCE, AND THE ENZYME GASTRICSIN, AND THE RESULTING PRODUCTS
Stewart G. Wolf, Jr., Ranwel Caputto, and Raul E. Trucco, Oklahoma City, Okla., assignors to Research Corporation, New York, N.Y., a corporation of New York
No Drawing. Filed Feb. 3, 1959, Ser. No. 790,808
15 Claims. (Cl. 195—62)

This invention relates to the production of a valuable therapeutic substance from mammalian material and particularly to the preparation of a gastric secretion inhibitor substance from tissue containing it, and especially to the isolation of said inhibitor substance from animal or human sources. This invention relates also to the production from said animal or human sources of a newly discovered proteolytic enzyme of gastric origin, namely, gastricsin.

Medical science has been aware for a number of years that the intravenous administration of normal human gastric content to animals produces a highly significant inhibition of both the quantity and acidity of the gastric juice of the animals so injected. It was further recognized that the stomach content of patients suffering from achlorhydria due to pernicious anemia or other causes, has greater inhibitor potency than normal human stomach content and that the gastric secretion inhibitory effect could also be obtained in animals by administration of various animal extracts of salivary or gastric origin. Further development of the potentialities of this specific inhibitor effect as a research tool and as a medical weapon against for example, peptic ulcer, has not been realized and in fact has been thwarted due to lack of a sufficiently potent extract containing the inhibitor substance. This lack is in turn due to the absence of a suitable process for isolating the inhibitor substance from animal, including human, material containing it.

Accordingly, this invention provides a method of isolating the inhibitor substance and for preparing a valuable and potent extract of it capable of convenient use in the field of medical science.

The process of this invention makes it possible for the first time to separate from the large molecular (i.e. high molecular weight) components of gastric content, such as pepsin, blood group A substance, various mucopolysaccharides and various proteins, etc., a fraction of the desired components which is responsible for a specific effect when administered to humans or animals, namely, the inhibition of gastric acid secretion.

The inhibitor itself is a water-soluble, non-dialyzable protein or mucoprotein which occurs in the gastric juice. Its effect is specific to quantity of secretion and acid, but it does not alter the secretion of pepsin or other nitrogen containing substances. The activity of the desired inhibitor is not destroyed by boiling for 15 minutes but it is destroyed by incubation with whole gastric juice for one-half hour at a pH of 1 and at 37° C.

A further application of the process of this invention, with modifications to be described hereinbelow, results in the isolation of a pure crystalline gastric proteolytic enzyme newly discovered by and identified by the present inventors, which we have called gastricsin. The production of gastricsin is a unique application of, and forms an essential part of, the present invention and because the isolation of gastricsin preferably and most conveniently proceeds concurrently with the isolation of the gastric secretion inhibitory substance, it is described and claimed herein.

Therefore, it is an object of this invention to provide a process for the fractionation of material containing gastric secretion inhibitory substance and gastricsin.

It is a further object of this invention to provide a chromatographic fractionation process whereby the isolation of gastric secretion inhibitory substance and of gastricsin may be readily accomplished.

Another object of this invention is to provide a chromatographic resin column extraction procedure for gastric juices which results in the isolation therefrom of the desired gastric secretion inhibitory substance and pure crystalline gastricsin.

A further important object of this invention is to provide a potent extract containing the gastric secretion inhibitory substance suitable for therapeutic use.

A specific object of this invention is to provide a method for producing a fraction of gastric juice which has a gastric secretion inhibitory potency of the order of approximately five times its weight of whole gastric juice.

Still another object of this invention is to provide a method for isolation and purification of the newly discovered enzyme, gastricsin.

Further objects and advantages will appear from the detailed description and discussion of the invention which follows and which is set forth first in relation to the isolation of the gastric secretion inhibitory substance and secondly in relation to the isolation of gastricsin.

The process of this invention comprises generally the steps of obtaining a crude source of inhibitor such as animal gastric tissue and/or juices, or human gastric juice; separating the macromolecular substances comprising this source material; factionating these substances by chromatrographic procedures such as contacting same with an ion-exchange resin; collecting the various inhibitor substance-fractions thus obtained; and finally purifying the inhibitor substance-containing fractions so as to provide a dry powdered substance which may be standardized and used, e.g. in aqueous solution, in the management of medical patients.

By the process of this invention an active fraction containing the inhibitor factor can be isolated in a relatively pure form from the initial source. The product of this invention may then be easily re-constituted for use in the treatment of e.g. peptic ulcer patients.

More specifically, the process of this invention comprises preparing a liquid extract of the source material which contains the gastric secretion inhibtor substance, dialyzing this solution or suspension against distilled water to remove the salts and other low molecular weight components and lyophilizing the dialysate to a dry powder.

The dried powder containing the large molecular components, i.e., the colloid fraction of the dialysis procedure, is then dissolved in a buffered aqueous solution and the insoluble portion removed.

As a feature of the present invention, it has been discovered that the gastric secretion inhibitory substance can be and is selectively adsorbed on a suitably prepared fractionation column of ion-exchange resin and further that by maintaining proper conditions of pH in the column by using suitable buffered eluants, the inhibitor substance is selectively released within a predetermined range of pH values.

The inhibitor substance, therefore, may be collected separately in the fraction eluted within that range, pooled, purified by dialysis, and dried by lyophilization. The resultant dried powder is a relatively pure extract of gastric secretion inhibitor substance having the properties previously mentioned which is many times more potent than the original starting material on a weight basis. It may be subjected to biological standardization and suitably packaged to supply, upon the addition of a vehicle such as isotonic saline solution, a calculated dose or doses of predetermined potency.

The following description of a preferred embodiment of the process of this invention will serve to illustrate in detail (1) the preparation of a suitable source material, e.g., human gastric juice; (2) the preparation of the chromatographic resin column; (3 the fractionation procedure; and (4) the test procedure for determining the biological activity of the product of the invention.

EXAMPLE I

Collection and Storage of Gastric Juice

Gastric juice is collected from intubated normal fasting patients stimulated with a gastric secretogogue such as insulin or histamine or reserpine. Care is taken to avoid contamination with saliva and nasopharyngeal secretion. The gastric contents from the subjects are collected in containers containing a small amount of chloroform (for antiseptic purposes), and immersed in ice water. This material is pooled and dialyzed in cellophane tubing against five changes of distilled water at 4° C. in the presence of chloroform. It is then lyophilized and the resulting dried powder stored in a desiccator at 4° C.

Preparation of the Resin Column

Fractionation of the whole dried gastric juice is accomplished as described hereinafter, with a suitable ion-exchange resin such as Amberlite IRC–50 (XE–64) obtained from the Rohm and Haas Company, Philadelphia, Pennsylvania. This is a carboxylic acid type cation exchange resin which is weakly acidic and in hydrogen form. It is granular and of 100–400 mesh as purchased. The resin is treated as follows in order to prepare it for the fractionation step which follows:

A mass of resin having a 200–400 mesh range is prepared. To 1.5 kilos of this resin, 3.5 liters of water are added and the suspension is stirred for 20 minutes. After a settling period of 30 minutes, any foam on the surface is removed and the supernatant suspension is withdrawn. The settling process is repeated four or five times with 2-liter portions of water until the supernatant liquid is clear after about 15 minutes of settling. The resin is air-dried on a Buchner funnel. The resin filter cake is added to 4 liters of acetone and stirred for 3 hours. The resin is filtered and washed with acetone (about 8 liters) until the filtrate is clear. The air-dried resin is suspended in water, stirred until all bubbles are eliminated and the last traces of acetone are removed by washing the filter with 24 liters of water.

The resin is cycled once through the sodium form before use, as follows: To the resin in 5 liters of water, 560 gm. of sodium hydroxide (in the form of a 40 percent solution) are added over a period of 30 minutes. The pH of the suspension will rise to about 11. Stirring is continued until evolution of heat has subsided (3 hours), and the sodium salt of the resin is then washed by decantation with five 2-liter portions of water. The resin is washed on a filter with water (about 12 liters) until the filtrate has a pH of about 10. The resin is converted to the acid form by passing 10 liters of 3 N hydrochloric acid through the filter over a 4 hour period, and is finally washed with 6 liters of water.

A suspension in water of 100 gm. of the thus-treated resin (now in the acid form) is poured into a chromatographic tube of 4.5 cm. diameter which gives a column 20 cm. high. The column is then equilibrated with 0.2 M citrate buffer at pH 3.0 (formula given below) by passing the buffer through the column until the effluent reaches a pH of 3.

Fractionation Procedure

*Loading of the column.*—3 gm. of dried gastric juice prepared as described above are dissolved in 120 ml. of 0.2 M citrate buffer of pH 3.0 (see formula below) and the insoluble portion separated by centrifugation at 10,000×g and then removed. The centrifuged solution is poured into the column.

*Running of the column.*—The column is then run from pH 3.0 to pH 8.5 with the following buffers: 0.2 M citrate of pH 3.0; 0.2 M citrate of pH 3.8; 0.2 M citrate of pH 4.2; 0.2 M citrate of pH 4.6; 1.0 M phosphate of pH 5.3; 1.0 M phosphate of pH 6.2; 1.0 M phosphate of pH 7.0; and 1.0 M phosphate of pH 8.5.

The composition and preparation of the buffers are as follows:

0.2 M citrate pH 3.0:
  Citric acid _____ gm__ 42.0
  Sodium hydroxide _____ gm__ 4.4
  Sodium chloride _____ gm__ 13.5
  Distilled water _____ liter__ 1

0.2 M citrate pH 3.8 and pH 4.2:
  Citric acid _____ gm__ 42.0
  Sodium hydroxide _____ gm__ 7.0
  Sodium chloride _____ gm__ 9.6
  Distilled water _____ liter__ 1

0.2 M citrate pH 4.6:
  Citric acid _____ gm__ 42.0
  Sodium hydroxide _____ gm__ 12.0
  Sodium chloride _____ gm__ 2.34
  Distilled water _____ liter__ 1

The substances are dissolved in less than 1 liter of water, then a concentrated solution of sodium hydroxide is added to adjust to the desired pH, and finally the volume is adjusted to 1 liter.

1.0 M phosphate pH 5.3:
  Sodium monophosphate (i.e.,
    $NaH_2PO_4$) _____ gm__ 120.0
  Sodium hydroxide _____ gm__ 10.0
  Distilled water _____ liter__ 1

1.0 M phosphate pH 6.2:
  Sodium monophosphate _____ gm__ 120.0
  Sodium hydroxide _____ gm__ 12.0
  Distilled water _____ liter__ 1

1.0 M phosphate pH 7.0:
  Sodium monophosphate _____ gm__ 120.0
  Sodium hydroxide _____ gm__ 12.4
  Distilled water _____ liter__ 1

1.0 M phosphate pH 8.5:
  Sodium monophosphate _____ gm__ 120.0
  Sodium hydroxide _____ gm__ 18.0
  Distilled water _____ liter__ 1

The buffers are run through the column in the order specified above. One changes to the buffer of the next higher pH when the pH of the effluent approaches that of the influent buffer. The buffer in the reservoir at the top of the column is removed just to the top of the resin and the next buffer to be used is added carefully to the top of the resin. A few cc. of chloroform (for antiseptic purposes), are added to the containers of the buffers to keep them saturated while they are running through the column. The rate of flow is about 8 ml./20 minutes. Elution of the protein components is followed by measuring absorption at 280 mu of the eluates in silica cells with a quartz Spectrophotometer.

The fractions are collected in each of the following pH intervals: fraction #1, 1200 ml., from pH 3.0 to 3.9; fraction #2, 1800 ml., from pH 3.9 to 4.6; fraction #3, 2100 ml., pH 4.6 to 5.4; fraction #4, 1700 ml., pH 5.4 to 6.15 and fraction #5, 3200 ml., pH 6.15 to 8.5. Each fraction is pooled separately. These fractions are dialyzed in cellophane tubing against five changes of distilled water at 4° C. in the presence of chloroform. They are then lyophilized and the dried powder stored in a desiccator at 4° C. The weight of each dried fraction is #1, 0.278 gm.; #2, 0.595 gm.; #3, 0.715 gm.; #4, 0.156 gm. and #5, 0.480 gm.

The collection of the eluate in more than two separate fractions as described above facilitates the recovery of other components of the gastric material. It may be possible however, where the gastric secretion inhibitor alone is desired, to run the fractionation column from the starting pH more rapidly up to pH 6.15, using an initial buffered eluant of pH 6.15 and begin the collection of the active inhibitor fraction at that point.

*Activity Test*

The inhibitor is assayed for its biological activity in inhibiting gastric secretion of Heidenhain Pouch dogs.

The operated dogs are allowed to stabilize for 3–4 week period before tests are begun; control juice collections are then obtained daily during a four hour period after the dogs have been fed and tests are started only when these collections become fairly constant. The juice drains into rubber bladders attached to the cannula and supported by a sling about the dog. Volume, free and total acidity are measured.

Tests are carried out in the following fashion: Dogs are fed with a test ration and fifteen minutes later injected intravenously with one of the dried fractions which has been dissolved in isotonic saline solution at a concentration of 1 mg./ml., centrifuged and filtered through sterilized glass sintered filter (U.F. Pyrex). The dose of each fraction is uniform, 0.2 mg./kg. of dog weight. For comparative purposes, some dogs are injected with 1 mg./kg. of dog weight of the whole dried gastric juice. Rubber bladders are attached to the cannula fifteen minutes after injection and kept on for four hours. The rubber bladders are then removed, the juice collected and determinations made as to volume, free and total acidity. Rectal temperatures are taken frequently during the post-injection period and the dogs are observed closely for reactions. If a rise in body temperature greater than 1.5° F. occurs or if the dog vomits after the injection the test is discarded.

*Results of the Tests*

TABLE I

| Injection of— | Dose | Percent change in Secretion 4 hrs. after Injection | |
| --- | --- | --- | --- |
| | | Volume | Free Acid |
| Fraction No. 1 | 0.2 mg./kg. dog weight. | 0 | 0 |
| Fraction No. 2 | ____do____ | 0 | 0 |
| Fraction No. 3 | ____do____ | 0 | 0 |
| Fraction No. 4 | ____do____ | 0 | 0 |
| Fraction No. 5 | ____do____ | −50 | −50 |
| Whole dried Gastric juice | 1 mg./kg. dog weight. | −50 | −50 |

Analysis of the gastric juices collected following the injections indicates that inhibitory activity is present only in fraction No. 5 (eluted at pH 6.15–8.5) and in the whole dried gastric juice. The normal gastric secretion of the test animals is reduced 50% by the injection of fraction No. 5 and of whole dried gastric juice as shown in Table I. Because the injected dose of whole dried gastric juice is five times as great as that of the fraction No. 5, however, these results show that fraction No. 5 is five times as potent on a weight basis as the whole dried gastric juice.

Furthermore, the lack of inhibitory activity of the other fractions also indicates that substantially all the gastric secretion inhibitory activity is present in fraction No. 5, in a form which is relatively pure and which with relative ease may be administered intravenously to obtain the desired effect of gastric secretion inhibition.

While the above test was conducted on dogs the same relationship between whole dried gastric juice and the active fraction is believed to hold for human administration also. Thus, since the intravenous administration to humans of 0.1 mg./kg. of body weight of whole dried gastric juice has produced evidence strongly suggestive of inhibition, the dose of the gastric secretion inhibitory product of this invention may be stated as approximately 0.02 mg./kg. body weight. The dose, however, must be determined by the circumstances and condition of each patient.

It is noted that under the conditions of the fractionation procedure given above, it has been discovered according to the present invention that the inhibitor substance can be successfully eluted from the column by appropriate buffer solutions within a certain range of pH of the effluent, namely, 6.15–8.5. The fraction thus obtained when dialyzed and lyophilized represents only about 10% of the weight of the whole dried gastric juice from which it has been separated. This product containing gastric secretion inhibitory substance is obviously vastly preferable to a crude whole extract of gastric content or of gastric tissue and will find valuable use not only in peptic ulcer patients but in other syndromes involving hypersecretion of stomach acid.

A further advantage and result of the process of this invention is the isolation from human gastric juice of a heretofore unknown and unidentified proteolytic enzyme. This enzyme is here called "gastricsin" to distinguish it from pepsin, the only previously known proteolytic enzyme of human gastric origin.

This enzyme, gastricsin, is obtained from whole gastric juice in a pure crystalline form by subjecting the gastric juice to the same process steps as described above in Example I, and further purification with ammonium sulphate. Gastricsin is obtained as a homogeneous fraction and is eluted at an effluent pH of 4.4. Therefore, it may be isolated during the running of the column in accordance with the above example simply by collecting separately the elute of pH 4.4. Another method for isolating gastricsin is by the further fractionation of the fraction obtained at an eluant pH of 3.9–4.6 (fraction No. 3) in the above Example I by rerunning it through a similar resin column under similar conditions. The gastricsin again will be present in the eluate at pH 4.4 as a homogeneous aqueous fraction.

By either method, the gastricsin is successfully separated from the pepsin which if present is eluted by the process of this invention at the pH range of 3.8 to 4.4. The presence of pepsin in the eluate within this range has been previously demonstrated by the present inventors. (Archives of Biochem, and Biophysics, 66, 155–166 (1957).)

The isolation of gastricsin in accordance with this invention is illustrated by the following example.

EXAMPLE II

Again referring to the process of Example 1, 2 gm. of a similarly prepared whole dried gastric juice are fractionated in the same manner and an eluant of pH 4.4 measuring 200 ml. is obtained. Following dialysis and lyophilization of this eluant fraction a chromatographically pure product (gastricsin) weighing 36 mg. is recovered.

*Crystallization of the Enzyme*

This product is then crystallized by the following procedure: The dried powder is dissolved in a 12 ml. centrifuge tube containing 2.0 ml. of ice cold distilled water. The solution is centrifuged at 2,000 r.p.m. for 5 minutes to remove any insoluble material which may be present due to denaturation of the enzyme during lyophilization. The supernatant is poured into another centrifuge tube, put back immediately into an ice bath, and 0.26 gm. of crystalline $(NH_4)_2SO_4$ added. The tube is stirred gently until the $(NH_4)_2SO_4$ is completely dissolved and then centrifuged at 2,000 r.p.m. for 10 minutes. The clear supernatant is decanted and discarded. The precipitate is dissolved with 2 cc. of water and the previous precipitation is repeated. The tube containing the precipitate is returned to an ice bath and 2 ml. of Na-acetate buffer (pH 5.0) is added to dissolve the precipitate. Small portions of crystalline $(NH_4)_2SO_4$ are added to the solution and stirred so that the $(NH_4)_2SO_4$ goes into complete solution after each addition. This process is stopped at the first indication of protein precipitation. The amount required is approximately 0.2 gm. $(NH_4)_2SO_4$. The tube is then moved to a water bath (about 20° C.) and left for 5 minutes. If the turbidity disappears, very small drops of saturated $(NH_4)_2SO_4$ solution are added gradually, until the turbidity reappears. The solution is stirred thoroughly after addition of each drop. The tube is then moved to 40° C. water bath and kept in it for 5 minutes. The turbidity usually disappears; when it does not it is centrifuged and the insoluble material removed.

The tube is placed in a beaker containing 2 liters of water at 30° C. Then the beaker is moved into the 4° C. cold room where after 6–8 hours a white precipitate is formed. The first precipitate however is mostly non-crystalline material and is removed by centrifugation at a low speed (in the 4° C. cold room or in a refrigerated centrifuge). The supernatant is left standing at 4° C. for a period of 20 to 30 hours during which crystals are formed. After the crystals have been standing for 2–3 days the first collection is made by centrifuging at low speed. The supernatant which still contained high enzyme activity is left standing for more crystals to form. When no significant increase of crystals in the suspension is observed, after another 6 hours, drops of saturate ammonium sulphate solution are added. The yield of crystalline gastricsin is 20% (7.2 mg.) of the chromatographically pure material.

Dry weight yields, specific activities and activity recoveries of chromatographically pure and crystalline gastricsin obtained from preparation described in Example II are shown in the following Table II:

TABLE II

| Fractions | Dry Weight, mg. | Specific [1] Activity, O.D.280/mµ | Total Activity, Percent |
|---|---|---|---|
| Freeze-dried Gastric Juice | 2,000 | 4.6 | 100 |
| Chromatographic Fraction | 36 | 153.6 | 60 |
| Crystals | 7.2 | 227.5 | 17.8 |

[1] Determined by method of Anson and Mirsky, J. Gen. Physiol., 16, 59 (1932).

*Properties of the Enzyme*

Properties of gastricsin and its comparison with other proteolytic enzymes are illustrated in the following Table III:

TABLE III

| Enzyme | Optimal pH | Electro-phoretic Migration | | Relative Milk Clotting Activity, $\frac{Cr \times Tr}{C \times T} \times 100$ [3] | Relative Proteolytic Activity, $\frac{(PA) \times Cg}{(PA)_g \times C} \times 100$ [4] | Heat Inactivation at 65° C.[5] | |
|---|---|---|---|---|---|---|---|
| | | Paper,[1] cm. | Starch,[2] cm. | | | pH 2.0, percent | pH 3.0, percent |
| Gastricsin | 3.0 | 0 | 6.5 | 43.3 | 100 | 44.8 | 22.3 |
| Human pepsin | 1.5–2.0 | 9.0 | 9.34 | 44.6 | 80.0 | 69.0 | 11.2 |
| Hog pepsin | 2.0 | 9.7 | 10.0 | 65.6 | 66.6 | | |
| Rennin | | | | 100.0 | 8.15 | | |

[1] Using Spinco Durram type cell with pH 5.0 acetate buffer of ionic strength 0.1 and the Spinco electrophoresis paper strips. The experiments were run with eight three cm. strips at a constant field strength of 140 volts, during 24 hours at 4° C.
[2] Using Reco Model E-800–2 electrophoresis cell with pH 5.0 acetate buffer of ionic strength 0.1 the experiments were run at a constant field strength of 4.55 volts/cm. during 22 hours at room temperature.
[3] $Cr$ is the concentration of rennin, $Tr$ is the clotting time for rennin. $C$ and $T$ are the concentration and clotting times for the respective enzymes. Clotting times measured according to the method of Berridge.
[4] $(PA)_g$ is the O.D. at proteolytic activity 280 mu of the deproteinized solution from gastricsin assay, $Cg$ is the concentration of gastricsin and $C$ and $(PA)$ the concentration and the O.D. 280 mu from the deproteinized solutions from the assays of the respective enzymes. Proteolytic activity is measured according to the method of Anson and Mirsky.
[5] The enzyme solutions were incubated for 10 minutes at the indicated temperature and the proteolytic activity measured. The losses of activity were expressed as percent of inactivation relative to that of the solution incubated at 45° C.

There is some indication that gastricsin is present in hog stomach and crude commercial preparations of pepsin.

While two examples of the preferred method embodying the present invention have been described along with the resultant products, it will be apparent that many changes and modifications may be made in the details of the methods of procedure without departing from the spirit of the invention. For example, although human gastric juice has been specifically used herein, the source material may be animal gastric juice or tissue such as hog stomach, particularly for commercial exploitations of the process of this invention. Additionally, other inorganic buffers of appropriate pH such as borate may be used. Also the rate of flow of the elueates is calculated to ensure complete extraction and may vary within, for example, 15 and 45 ml./hr.

The size of the resin column will depend generally on the amount of the material to be fractionated and the resin itself will in accordance with per se known chromatographic techniques be chosen to supply along with appropriately chosen buffers, the conditions of pH essential to fractionation and eluation of the products of the invention as set forth herein. Of the available apparatus suitable for the fractionation and collection aspect of this invention we refer, for the sake of brevity, only to the automatic fraction collecting apparatus disclosed in U.S. Patent No. 2,654,522 to Gorham.

Therefore, it will be understood that the examples given and the details of the procedures set forth herein are intended to be illustrative only are are not intended to limit the scope of the invention.

What is claimed is:

1. In a process for isolating the enzyme gastricsin and a water-soluble, protein-containing, gastric secretion inhibitory substance from gastric material of animal, including human, origin, the steps of selectively adsorbing the water-soluble non-dialyzable components of said gastric material on a column of carboxylic acid type cation-exchange resin equilibrated at about pH 3, eluting the said column with a series of inorganic buffer solutions of increasing pH values within the range of from about 3 to about 8.5, said series containing members having approximate pH values of 3, 3.8, 4.2, 4.6, 5.3, 6.2, 7.0, and 8.5, and each of said members being employed until the effluent pH reaches a value equal to that of said member, producing eluate having a pH value gradually increasing from about 3 to about 8.5, collecting separately the fraction eluted at the pH of about 4.4 and the fraction eluted at the pH of from 6.15 to about 8.5, recovering the enzyme gastricsin from said first named fraction, and recovering from said second named fraction a concentrate comprising said gastric secretion inhibitory substance and having a potency of at least five times that of an equal weight of whole dried gastric juice.

2. The process as defined in claim 1 wherein the column is eluted successively with a series of aqueous inorganic buffered citrate solutions having pH values of about 3.0, 3.8, 4.2, and 4.6, and a series of aqueous inorganic buffered phosphate solutions having pH values of about 5.3, 6.2, 7.0, and 8.5.

3. A process for isolating a water-soluble, protein-containing, gastric secretion inhibitory substance from gastric material of animal, including human, origin which comprises selectively adsorbing the water-soluble non-dialyzable components of said gastric material on a column of carboxylic acid type cation-exchange resin equilibrated at about pH 3, eluting the column at an increasing pH value successively with a series of inorganic buffer solutions, said series including members having the approximate pH value of 6.15, 7.0 and 8.5, producing eluate having a pH gradually increasing from at least as low as that of the first member of said series to about 8.5, collecting separately eluate material obtained at pH from about 6.15 to about 8.5, dialyzing the said eluate material and lyophilizing the dialysate and recovering a concentrate of said gastric secretion inhibitory substance having a potency of at least five times that of an equal weight of whole dried gastric juice.

4. The process as defined in claim 3 wherein the column is eluted successively with a series of aqueous inorganic buffered solutions, chosen from the group consisting of: (1) citrate solutions having pH values of 3.0, 3.8, 4.2, and 4.6, and phosphate solutions having pH values of 5.3, 6.2, 7.0 and 8.5; and (2) phosphate solutions having pH values of 6.15, 7.0, and 8.5.

5. A process for the isolation of a pure proteolytic enzyme, gastricsin, from gastric material of animal, including human, origin which comprises adsorbing the water-soluble non-dialyzable components of said gastric material on a column of carboxylic acid type cation-exchange resin equilibrated at a pH of about 3, eluting the column successively at an increasing pH value with a series of aqueous inorganic buffered solutions having pH values of about 3, 3.8, 4.2, and 4.6, said last three members of said series being applied successively as the effluent pH approaches that of the member next lowest thereto, producing eluate having a pH value gradually increasing from about 3 to greater than about 4.4, collecting separately the eluate fraction having a pH of about 4.4, and subjecting the said fraction to dialysis and lyophilization, whereby gastricsin is obtained.

6. The process as defined in claim 1 wherein the said separately collected fractions are dialyzed and then lyophilized.

7. The process as defined in claim 1 wherein the said gastric material is dialyzed and lyophilized human gastric juice.

8. The process as defined in claim 3 wherein said gastric material is dialyzed and lyophilized human gastric juice.

9. The product prepared by the process of claim 3.

10. The process as defined in claim 5 wherein the column is eluted with a series of aqueous inorganic buffered citrate solutions.

11. The process as defined in claim 5 wherein the said dialyzed and lyophilized fraction is subjected to crystallization to obtain gastricsin in crystalline form.

12. The process as defined in claim 5 wherein the said dialyzed and lyophilized fraction is subjected to a crystallization procedure in the presence of ammonium sulphate whereby gastricsin is produced in crystalline form.

13. The process as defined in claim 5 wherein the said gastric material is human gastric juice which has been dialzed and lyophilized.

14. The product prepared by the process of claim 5.

15. The product prepared by the process of claim 6.

References Cited in the file of this patent

Archives of Biochemistry and Biophysics, 1957, Academic Press Inc., vol. 66, pp. 155–166.

UNITED STATES PATENT OFFICE

CERTIFICATE OF CORRECTION

Patent No. 3,026,251 March 20, 1962

Stewart G. Wolf, Jr., et al.

It is hereby certified that error appears in the above numbered patent requiring correction and that the said Letters Patent should read as corrected below.

Column 1, line 48, for "components" read -- component --; column 2, line 32, for "factionating" read -- fractionating --; column 6, line 35, for "elute" read -- eluate --; column 10, line 30, for "dialzed" read -- dialyzed --; line 32, for the claim reference numeral "6" read -- 11 --.

Signed and sealed this 10th day of July 1962.

(SEAL)
Attest:

ERNEST W. SWIDER
Attesting Officer

DAVID L. LADD
Commissioner of Patents